United States Patent
Xie et al.

(10) Patent No.: US 10,632,544 B2
(45) Date of Patent: Apr. 28, 2020

(54) CHUCK

(71) Applicant: Positec Power Tools (Suzhou) Co., Ltd., Suzhou, Jiangsu (CN)

(72) Inventors: Mingjian Xie, Suzhou (CN); Fei Wang, Suzhou (CN); Shangliang Run, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 17 days.

(21) Appl. No.: 16/047,137

(22) Filed: Jul. 27, 2018

(65) Prior Publication Data

US 2018/0369928 A1 Dec. 27, 2018

Related U.S. Application Data

(63) Continuation of application No. PCT/CN2016/105478, filed on Nov. 11, 2016.

(30) Foreign Application Priority Data

Jan. 29, 2016 (CN) .......................... 2016 1 0066336

(51) Int. Cl.
*B23B 31/12* (2006.01)
*B23B 31/28* (2006.01)

(52) U.S. Cl.
CPC .......... *B23B 31/1238* (2013.01); *B23B 31/12* (2013.01); *B23B 31/28* (2013.01);
(Continued)

(58) Field of Classification Search
CPC . B23B 31/1253; B23B 31/1238; B23B 31/12; B23B 31/28; B23B 2231/44;
(Continued)

(56) References Cited

U.S. PATENT DOCUMENTS 1,940,405 A * 12/1933 Englund ............... B23B 31/008
279/56
2,177,979 A * 10/1939 Davis ..................... B23B 31/06
279/155
(Continued)

FOREIGN PATENT DOCUMENTS

CN 1288802 3/2001
CN 1343540 4/2002
(Continued)

OTHER PUBLICATIONS

State Intellectual Property Office of the P.R. China, International Search Report for PCT/CN2016/105478 dated Jan. 18, 2017 (English Translation included).
(Continued)

*Primary Examiner* — Sunil K Singh
*Assistant Examiner* — Paul M Janeski
(74) *Attorney, Agent, or Firm* — Middleton Reutlinger

(57) ABSTRACT

The invention relates to a chuck having a sleeve, a chuck body, a plurality of chuck jaws, an adjusting mechanism configured to adjust relative movement between the chuck jaws and the chuck body, at least one locating member and a pushing mechanism. The locating member is disposed on the chuck body between the adjacent chuck jaws. When the adjusting mechanism drives the chuck jaws to approach to each other relative to the longitudinal axis, the pushing mechanism pushes the locating member to move towards the longitudinal axis. When the adjusting mechanism drives the chuck jaws to move away from each other relative to the longitudinal axis, the pushing mechanism pushes the locating member to move away from the longitudinal axis. Therefore, the operation is more convenient and safer; the aligning effect is precise and reliable, and the pre-tightening force is stable.

19 Claims, 14 Drawing Sheets

(52) U.S. Cl.
CPC ....... *B23B 2231/44* (2013.01); *B23B 2231/52* (2013.01); *Y10T 279/26* (2015.01)

(58) Field of Classification Search
CPC ................ B23B 2231/52; B23B 31/38; B23B 31/16291; B23B 31/16; Y10T 279/29; Y10T 279/17632
See application file for complete search history.

(56) References Cited

U.S. PATENT DOCUMENTS

| | | | | |
|---|---|---|---|---|
| 5,904,456 | A * | 5/1999 | Chern | B23B 31/1076 279/137 |
| 6,554,292 | B1 * | 4/2003 | Rohm | B23B 31/1238 279/137 |
| 7,040,630 | B2 * | 5/2006 | Huggins | B23B 31/1071 279/62 |
| 8,061,718 | B2 * | 11/2011 | Krondorfer | B23B 31/1071 279/137 |
| 2002/0109306 | A1 * | 8/2002 | Huggins | B23B 31/1238 279/24 |
| 2003/0075880 | A1 | 4/2003 | Girardeau | |
| 2003/0155722 | A1 | 8/2003 | Mack | |
| 2003/0155723 | A1 * | 8/2003 | Rohm | B23B 31/1071 279/62 |

FOREIGN PATENT DOCUMENTS

| | | |
|---|---|---|
| CN | 101284378 | 10/2008 |
| CN | 100493788 | 6/2009 |
| CN | 205324767 | 6/2016 |
| GB | 2364004 | 1/2002 |
| WO | 2006089117 | 8/2006 |
| WO | 2012156120 | 11/2012 |
| WO | 2017128813 | 8/2017 |

OTHER PUBLICATIONS

European Patent Office; Supplementary European Search Report; 2 pages; dated Aug. 2, 2019.

* cited by examiner

CHUCK

BACKGROUND OF THE INVENTION

The present invention relates to the clamps of drilling tool for machining, and in particular to a tool chuck.

When the tools such as a machine tool and an electric drill are used for the operation of drilling, milling and the like, a tool chuck is often used to clamp and locate a tool bit to improve the accuracy of drilling or milling. The tool chuck is usually comprising a chuck body, a plurality of jaws, a sleeve and a screw nut fixedly connected to the sleeve, the jaws are disposed in an inclined hole designed in the chuck body, and the jaws are driven to moves towards and away from the axis of the chuck body via the relative rotation between the chuck body and the sleeve, thereby realizing the clamping and releasing of the tool bit. However, in actual operation, in order to ensure that the tool bit is in the center of a clamping part, an operator often has to hold the tool bit with hand or other holding tool till the clamping jaws applies a certain action force to the tool bit, which is very inconvenient. More particularly when the size of the tool bit is smaller, the moving distance of the clamping jaws is bigger, the operator needs to hold the tool bit for long time for aligning and centering. Besides, in a bad working condition, the operation flexibility of the user is reduced, it is hard to align the tool bit with the clamping part of the drill chuck rapidly and then the operator has to repeat the operation again and again, and both time and labor are wasted. During a chuck mode of an auto chuck in which a motor drive the chuck body to rotate relative to the sleeve, the tool bit is easily impacted to be directly thrown out to injure the operator who holds tool bit.

In prior art, the CN patent CN100493788C discloses a rapidly pre-tightened drill chuck, comprising a chuck body, three jaws and a screw nut. An axial hole jointed with the drive shaft of a drill tool designed in the rear end of the chuck body. The shank portion of a tool bit is disposed in the front axial hole designed in the front end of the chuck body. The three jaws are respectively mounted in three inclined holes equidistantly disposed on the chuck body. The screw nut meshes with the three jaws. Three spring leaves are equidistantly disposed on the front axial hole adjacent to the three jaws. The three spring leaves and the three jaws are distributed at an interval of 60 degrees away from central lines of the three jaws, the center of the three spring leaves is located in a central axis of the axial hole in the front end of the chuck body, the front ends of the three spring leaves are naturally closed, the axial hole in the front end of the chuck body is further internally provided with a sleeve fixedly connected thereto, and the three spring leaves are fixed on the front end of the sleeve. By arranging the spring leaves, when the tool bit is replaced, a clamping handle of the tool bit can be directly inserted into a clamping opening formed by the spring leaves, and the tool bit is naturally clamped and aligned by an elastic force of the spring leaves per se without a need to hold the tool bit by hand.

Another CN patent CN 101284378A discloses a handheld power tool, comprising a tool chuck, at least one jaws of the chuck is provided with a magnet and the rear end of the tool bit is also provided with a magnet, so that the tool bit can be attached to the jaws by the action of the magnetic force between the two magnets on the jaw and the tool bit. By disposing the magnets on the jaw and the tool bit, the adsorption force between the jaw and the tool bit are enhanced.

SUMMARY OF THE INVENTION

The present invention provides a chuck safe to operate. A chuck, comprising: a sleeve; a chuck body rotatably disposed in the sleeve, wherein a longitudinal axis is defined extending along the direction of the chuck body; a plurality of chuck jaws configured to be distributed in the chuck body about the longitudinal axis being configured to be movable relative to the chuck body; an adjusting mechanism disposed between the sleeve and the chuck jaws being configured to adjust relative displacement between the chuck jaws and the chuck body; wherein the chuck further comprising at least one locating member being disposed between adjacent chuck jaws on the chuck body and a pushing mechanism, when the adjusting mechanism drives the chuck jaws moving close to the longitudinal axis, the locating member is driven by the pushing mechanism to move toward the longitudinal axis; and when the adjusting mechanism drives the chuck jaws moving away from each other along the longitudinal axis, the locating member is driven by the pushing mechanism to move away from the longitudinal axis.

Preferably, the chuck body is provided with a first shaft cavity for receiving a tool bit, a plurality of first guide holes and at least one second guide holes are formed on a side wall of the chuck body and communicating with the first shaft cavity, and wherein the plurality of first guide holes are annularly distributed around the first shaft cavity, the chuck jaws respectively extends into the first shaft cavity through the first guiding hole and the locating member extending into the first shaft cavity through the second guide hole.

Preferably, a center line of the first shaft cavity is coaxial with the longitudinal axis of the chuck body, and projections of the first guide holes and the second guide hole on the longitudinal axis are spaced apart.

Preferably, when the sleeve rotates along a first direction relative to the chuck body, the locating member extends into the first shaft cavity close to the longitudinal axis through the second guide hole to hold the tool bit, and the chuck jaws extend into the first shaft cavity through the first guide holes and approach to each other relative to the longitudinal axis so as to clamp the tool bit received in the first shaft cavity of the chuck body.

Preferably, the tool bit is held by the locating member before it is clamped by the chuck jaws.

Preferably, when the sleeve rotates in a second direction opposite to the first direction relative to the chuck body, the locating member moves away from the longitudinal axis, and the chuck jaws are apart from the longitudinal axis to release the tool bit received in the first shaft cavity of the chuck body.

Preferably, the pushing mechanism comprises a first driving member sleeved on the chuck body and a first transmission mechanism for converting a rotation motion of the first driving member relative to the chuck body into a reciprocating motion of the first driving member along an axial direction of the chuck body.

Preferably, the first transmission mechanism comprises a thread component disposed between an inner surface of the first driving member and an outer surface of the chuck body.

Preferably, further comprising a restricting mechanism disposed between the first driving member and the sleeve, the restricting mechanism is configured to prevent the first driving member from rotating relative to the sleeve.

Preferably, the restricting mechanism comprises a first guide part disposed on the first driving member and extending along an axial direction of the first driving member, and a second guide part disposed on the inner wall of the sleeve and cooperating with the first guide part, one of the first guide part and the second guide part is configured as a guide rail and the other of the first guide part and the second guide part is configured as a guide groove to be engaged with the guide rail.

Preferably, the pushing mechanism further comprises a first biasing member biased against the locating member, thus the locating member has a moving tendency to move away from the longitudinal axis.

Preferably, the first driving member comprises a first inclined pushing surface, the locating member comprises a matching part abutting against the inclined pushing surface and a holding part for extending into the first shaft cavity.

Preferably, the first biasing member is a spring sleeved around the holding part, one end of the spring abutting against the chuck body and the other end of the spring abuts against a step surface of the matching part.

Preferably, the pushing mechanism comprises a second driving member cooperated with the locating member, and a second transmission mechanism for matching with the second driving member, the chuck jaws selectively abut against the second driving member to push the second driving member moving or to be separated from the second driving member, and when the chuck jaws abut against the second driving member and push the second driving member to move, the locating member is away from the longitudinal axis.

Preferably, the pushing mechanism further comprises a second biasing member for providing a restoring force towards the longitudinal axis when the chuck jaws are separated from the second driving member.

Preferably, the second transmission mechanism comprises a transmission member coupled to the second driving member and a support member fixedly disposed relative to the chuck body, the second biasing member is disposed between the transmission member and the support member.

Preferably, the second bias member is a spring, the transmission member comprising a first abutting part, and the support member comprising a second abutting part configured to cooperate with the first abutting part.

Preferably, the locating member is configured as a plurality of elastic locating members.

Preferably, the elastic locating member comprises a holding part and an elastic cushion disposed at the end of the holding part away from the pushing mechanism, the elastic cushion is configured to provide elastic holding force to the tool bit.

Preferably, the locating member is a magnet locating member.

Preferably, the magnetic locating member comprises a holding part and a magnet disposed on one end of the holding part away from the pushing mechanism for righting the tool bit by the adsorption force between the magnet and the tool bit.

Preferably, the chuck jaws closing to each other to clamp the tool bit while the magnetic locating member being to right the tool bit.

Preferably, amount of the locating members is consistent with that of the chuck jaws (8).

Preferably, the locating members are respectively disposed between two adjacent chuck jaws.

Preferably, the adjusting mechanism comprises external threads disposed on outer walls of the chuck jaws and a screw nut disposed in the sleeve meshing with the screw nut.

Preferably, the chuck jaws on the chuck body are inclined, internal thread surface of the screw nut is a conical surface corresponding to the inclination of the chuck jaws.

Preferably, the sleeve comprises a front sleeve and a rear sleeve coupled to the front sleeve, a screw nut is disposed between the rear sleeve and the chuck body.

Preferably, inner wall of the rear sleeve is provided with a support ring for supporting the chuck body.

Preferably, an end bearing is further disposed between the rear sleeve and the chuck body, and one side of the end bearing being abutting against the screw nut, and the other side of the end bearing being stopped by a washer.

Since the above technical solution is adopted, the present invention overcomes the defects of an instable pre-tightening action, a poor aligning effect and unsafe operation of the aligning and pre-tightening structures of the drill chucks in the prior art, such that the tool bit does not need to additional manual holding operation during the chuck mode, and therefore, the operation is more convenient and safe. Besides, the aligning effect is precise and reliable, and the pre-tightening force is stable.

Figure 1:
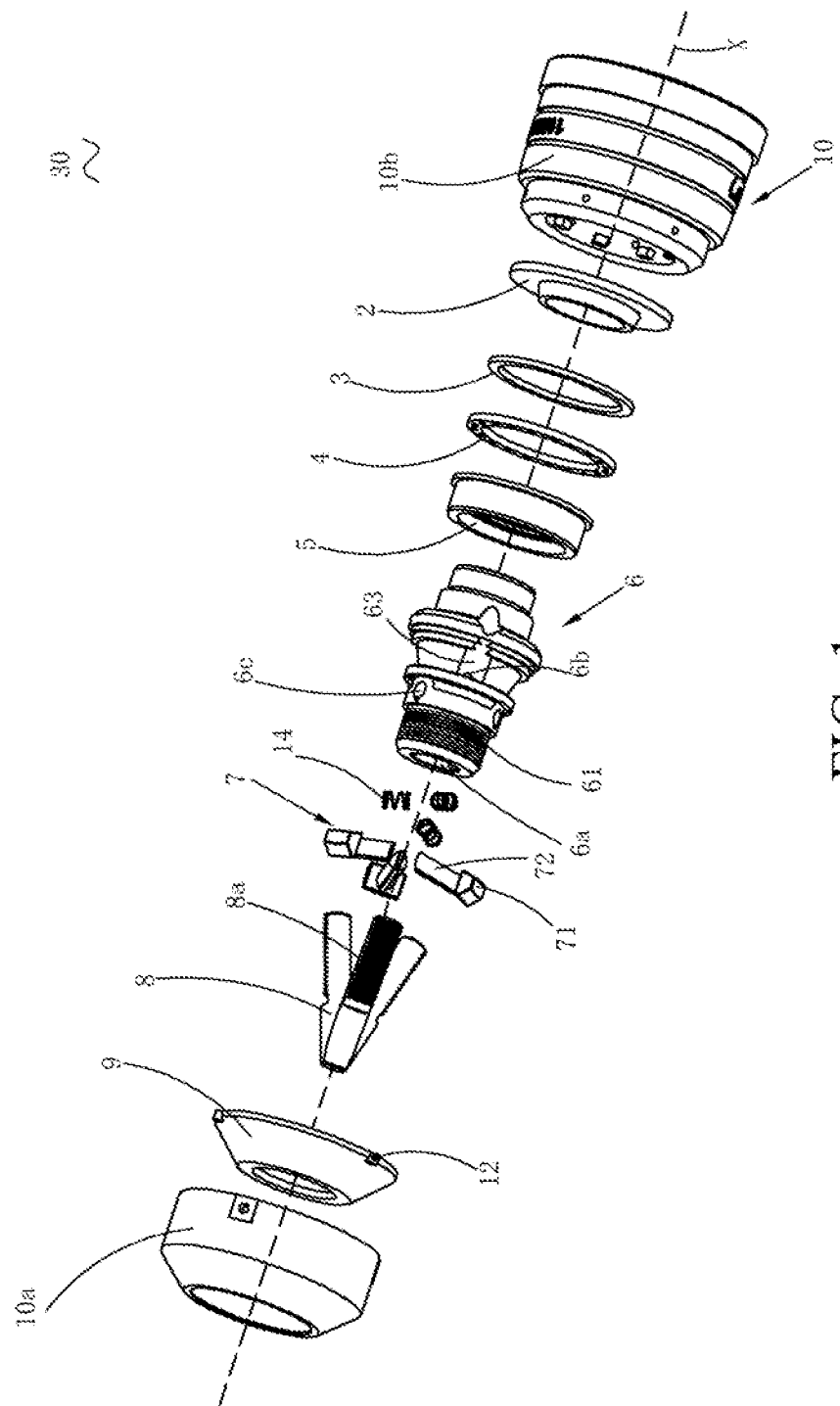
FIG. 1 is a stereoscopic exploded drawing of a chuck according to a first embodiment of the present invention.

Wherein,

| | | |
|---|---|---|
| 10-sleeve | 6-chuck body | 74-holding part |
| 10a-front sleeve | 6a-first shaft cavity | 8-jaw |
| 10b-rear sleeve | 6b-first guide hole | 8a-external thread |
| 11-magnet | 6c-second guide hole | 9-driving ring |
| 12-guide rail | 62-second shaft cavity | 9a-internal thread |

-continued

| | | |
|---|---|---|
| 13-guide groove | 63-guide groove | 9b-inclined pushing surface |
| 14-spring | 7-locating member | 92-driving member |
| 15-tool bit | 7a-magnetic locating member | 94-transmission member |
| 2-support ring | 7b-nonmagnetic locating member | 96-elastic member |
| 3-wahser | 7s-elastic locating member | 98-support member |
| 30, 30a-automatic straightening chuck | 71-matching part | 97-snap spring |
| 4-end bearing | 71a-first matching part | 94a-first abutting part |
| 5-screw nut | 72-holding part | 98a-second abutting part |
| 51-support member | 72a-elastic cushion | |

DETAILED DESCRIPTION OF THE PREFERRED EMBODIMENT

In the following, the technical solutions of the present invention will be described clearly and completely in combination with the drawings. It is obvious that the described embodiments are partial one instead of all of the embodiments of the present invention. All other embodiments obtained by those ordinary skilled in the art based on the embodiments in the present invention without paying creative labor belong to a scope of the present invention.

In the description of the present invention, it should be noted that the direction or position indicated by the terms "front", "rear", "center", "up", "down", "left", "right", "vertical", "horizontal", "inner", "outer" and the like are based on the direction or position relationships as shown in the drawings, and they are merely intended for describing the present invention conveniently and simplifying the description rather than indicating or implying that the referred devices or elements must have specific directions and construction or operation in the specific directions, and thus they cannot be understood as a limitation to the present invention. In addition, the terms "first", "second" and "third" are merely intended for description and cannot understood as the indication or implication of relative importance.

In the description of the present invention, it should be noted that the terms "mounting", "connected" and "connection" should be understood in a generalized way unless specified otherwise, and for example, it can be fixed connection, detachable connection, or integral connection; and also can be mechanical connection or electrical connection; and also can be direct connection, or connection by a middle medium; and also can be internal communication of two elements. For those ordinary skilled in the art, specific meanings of the above terms in the present invention can be understood according to specific conditions.

In addition, the technical features involved in different embodiments of the present invention described can be mutually combined as long as they do not conflict against each other.

First Embodiment

Referring to FIGS. 1 to 4, the embodiment provides a chuck 30, the chuck 30 has a sleeve 10, the sleeve 10 comprises a front sleeve 10a and a rear sleeve 10b coupled to the front sleeve 10a. The chuck body 6 having a longitudinal axis X is disposed within the sleeve 10 rotatable relative to the sleeve 10. A first shaft cavity 6a for mounting a tool bit is disposed on the front end of chuck body 6, and a central line of the first shaft cavity 6a and the longitudinal axis of the chuck body 6 are disposed coaxially. A plurality of first guide holes 6b communicated in the first shaft cavity 6a distribute around the first shaft cavity 6a with uniformity. And the first guide holes 6b are configured in the side wall of the chuck body 6. In the present embodiment, the number of the first guide holes 6b is three (FIG. 1 only shows one guide hole), but not limited to three. Each of the first guide holes 6b is configured to allow the jaw 8 to stretch and penetrate. One end of the each jaw 8 extend into the first shaft cavity 6a from the first guide holes 6b respectively, and the parts of the jaws 8 having extended into the first shaft cavity 6a form a clamping opening for clamping the tool bit together. The guide grooves 63 communicated with the first guide holes 6b disposed on the side wall of chuck body 6 inclinedly, and the other ends of the chuck jaws 8 extend from the first guide holes 6a and accommodated in the guide grooves 63 slidably. The external threads is disposed on the outer walls of the chuck jaws 8, a screw nut 5 is disposed on the inner side of the rear sleeve 10b. The screw nut 5 is coupled to the back sleeve 10b with relative rotation, when the sleeve 10 rotates relative to the chuck body 6, the chuck jaws 8 contained in the guide grooves 63 slides relative to the screw nut 8, that is, the chuck jaws 8 move in a reciprocating manner along the first guide holes 6b, and further the clamping opening is expanded or shrunk, so that the tool bit can be clamped or released.

The screw nut 5 disposed in the sleeve 10 and the external threads 8a of the chuck jaws 8 form an adjusting mechanism which can adjust the size of the clamping opening of the chuck jaws 8. Specifically, the sleeve 10 rotates relative to the chuck body 6, the sleeve 10 drives the screw nut 5 to rotate, and the screw nut 5 drives the chuck jaws 8 to move in a reciprocating manner in the first guide holes 6a; or the chuck body 6 rotates relative to the sleeve 10, the chuck jaws 8 rotate along with the chuck body 6 meanwhile moving in a reciprocating manner in the first guide holes 6b.

At least one second guide hole 6c communicated with the first shaft cavity 6a disposed on the side wall of the chuck body 6 which is configured to contain a locating member 7. The second guide holes 6c of the present embodiment are annularly distributed around the first shaft cavity 6a with uniformity disposed in a staggered manner with the first guide holes 6b. And the number of the second guide holes 6c is consistent with that of the first guide holes 6b, which is three. The second guide holes 6c are disposed close to the front sleeve 10a relative to the first guide holes 6b, and projections of the second guide holes 6c and the first guide holes 6b on the longitudinal axis X are separated.

Figure 2:
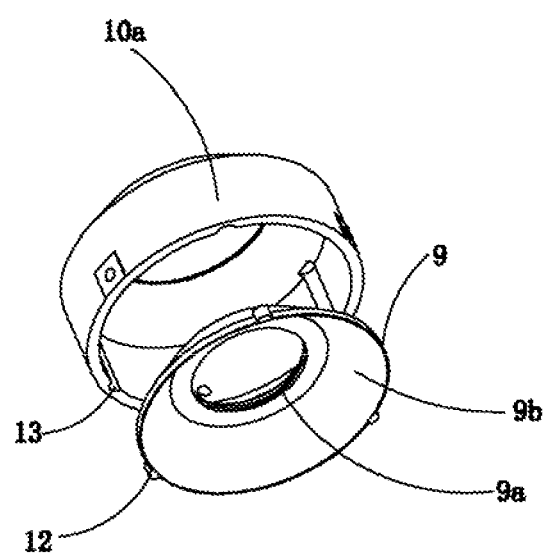
FIG. 2 is a structural drawing that a sleeve and a driving ring of the chuck in FIG. 1.

A pushing mechanism is disposed between the front sleeve 10a and the chuck body 6, comprising a driving member 9. The driving member 9 of the embodiment is configured as a horn-shaped ring cover, that is a driving ring, and it has a big opening part and a small opening part, the small opening part is close to the front sleeve 10a, the big opening part is close to the back sleeve 10b, and the driving ring 9 and the chuck body 60 are disposed coaxially. Referring to FIG. 2, an inclined pushing surface 9 is disposed between the big opening part and the smaller opening part, one end of the locating member 7 is inserted into the second guide hole 6c, and the other end is abutted against the inclined pushing surface 9b and can extend into the first shaft cavity 6b by an abutting action of the inclined pushing surface 9b.

A restricting mechanism is disposed between the sleeve 10 and the driving ring, specifically, the restricting mechanism comprises at least one first guide part disposed on the driving ring 9, and a second guide part disposed on the front sleeve 10a, wherein the first guide part is close to the outer edge of the big opening part of the driving ring 9. And the second guide part is disposed on the inner wall of the front sleeve 10a correspondingly. One of the first guide part and the second guide part may be configured to be a guide rail 12, and the other of the first guide part and the second guide part may be configured to be a guide groove 13 meshed with the guide rail 12.

Referring to FIG. 2, the first guide part of the embodiment is the guide groove 13, the second guide part is the guide rail 12, and two guide grooves 13 are disposed face to face configured to be 180 degree with each other, and so are the two guide rails 12. More than two guide grooves 13 may also be disposed around the inner wall of the front sleeve 10a, and the guide grooves 13 are parallel with the axis of the driving ring 9, so as to limit the driving ring 9 to move along the axial direction of the guide rails 13 in reciprocating manner.

When the sleeve 10 and the chuck body 6 rotate relatively, the driving ring 9 and the front sleeve 10a are coupled without relative rotation.

The locating member 7 is located between the driving ring 9 and the chuck body 6, the internal threads 9a is disposed on the inner side wall of the driving ring 9 close to the small opening. The external threads 61 is disposed on the chuck body 6, and the driving ring 9 disposed around the chuck body 6 being in threaded connection with the chuck body 6. When the sleeve 10 rotates relative to the chuck body 6, the driving ring 9 moves along the axial direction X of the chuck relative to the chuck body 6 while rotating along with the front sleeve.

The locating member 7 comprises a matching part 71 abutting against the inclined pushing surface 9 of the driving ring 9 and a holding part 72, and the holding part 72 can insert into the second guide hole 6c to extend towards the first shaft cavity 6a. A biasing member is disposed between the matching part 71 and the holding part 72, the matching part 71 approaching to the inclined pushing surface 9b of the driving ring 9 by an force of the biasing member, the reset bias pressure part of the present embodiment is a spring 14, the spring 14 disposed around the part of the holding part 72 extending out of the second guide hole 6c, one end of the spring 14 is abutted against the matching part 71 and the other end is abutted against the side wall of the chuck body 6.

Figure 3:
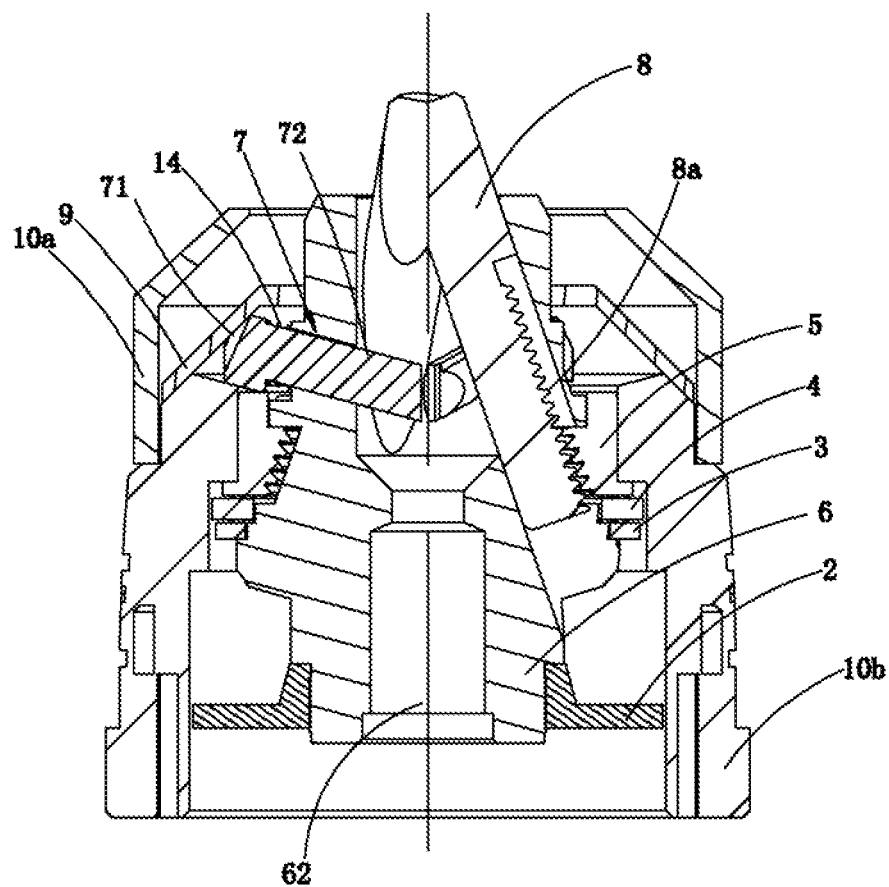
FIG. 3 is a sectional view that a clamping opening of the chuck as shown in FIG. 1 being in a closing state.

Referring to FIG. 3, when the sleeve 10 rotates relative to the chuck body 6 in a first direction, the front sleeve 10a drives the driving ring 9 to move towards the back sleeve 10b. During the movement of the driving ring 9, the inclined pushing surface 9b of the driving ring 9 forms an abutting force to the locating member 7, by the abutting force, the matching part 71 of the locating member 7 overcomes an bias force of the spring 14 to feed the holding part 72 into the first shaft cavity 6a via the second guide hole 6c, and the holding part 72 being in the first shaft cavity 6a moves to the center of the first shaft cavity 6a. Preferably, the inclined pushing surface 9b and an axis of the second guide hole 6c form a certain included angle, to ensure that the abutting force can push the locating member 7 into the first shaft cavity 6a. When the tool bit needs to be detached, the driving ring 9 can be driven to move apart from the rear sleeve 10b when the sleeve 10 rotates in a second direction opposite to the first direction. Then the locating member 7 moves apart from the center of the chuck body 6 by the bias force of the spring 14 disposed between the locating member 7 and the chuck body 6, so as to release the holding of the tool bit 15.

Figure 4:
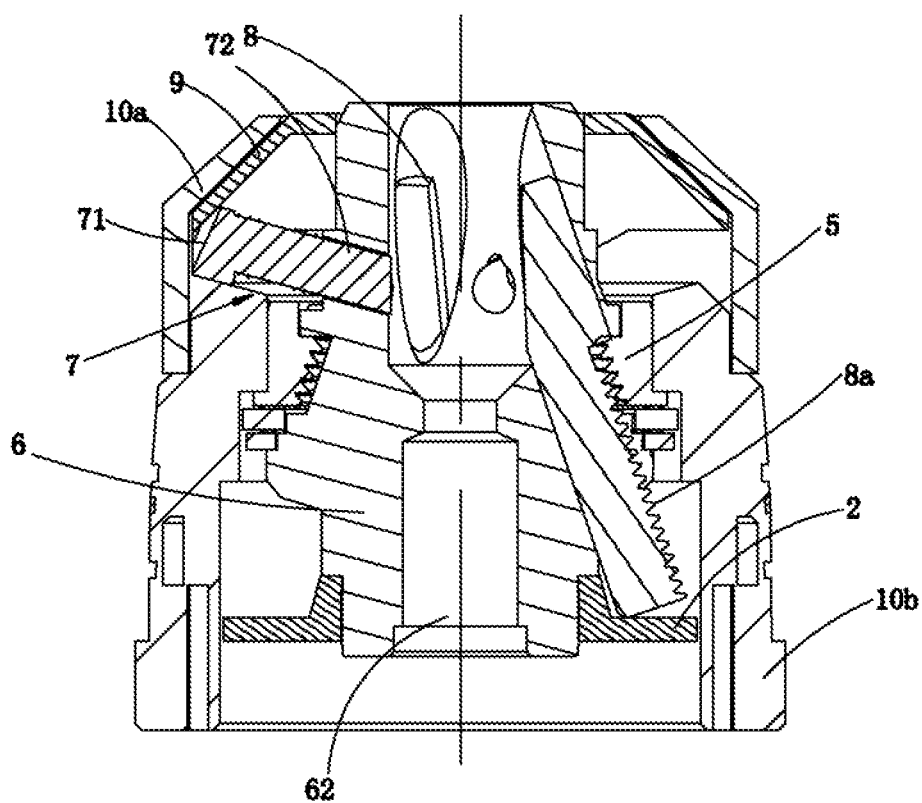
FIG. 4 is a sectional view that the clamping opening of the chuck as shown in FIG. 1 being in an opening state.

Referring to FIG. 4, when the sleeve 10 rotates relative to the chuck body 6 in a second direction opposite to the first direction, the driving ring 9 axially moves away from the back sleeve 10b while rotating with the front sleeve 10a. During the movement of the driving ring 9, the holding part 72 of the locating member 7 is moved out of the first shaft cavity 6a under the action force of the spring 14.

Figure 5:
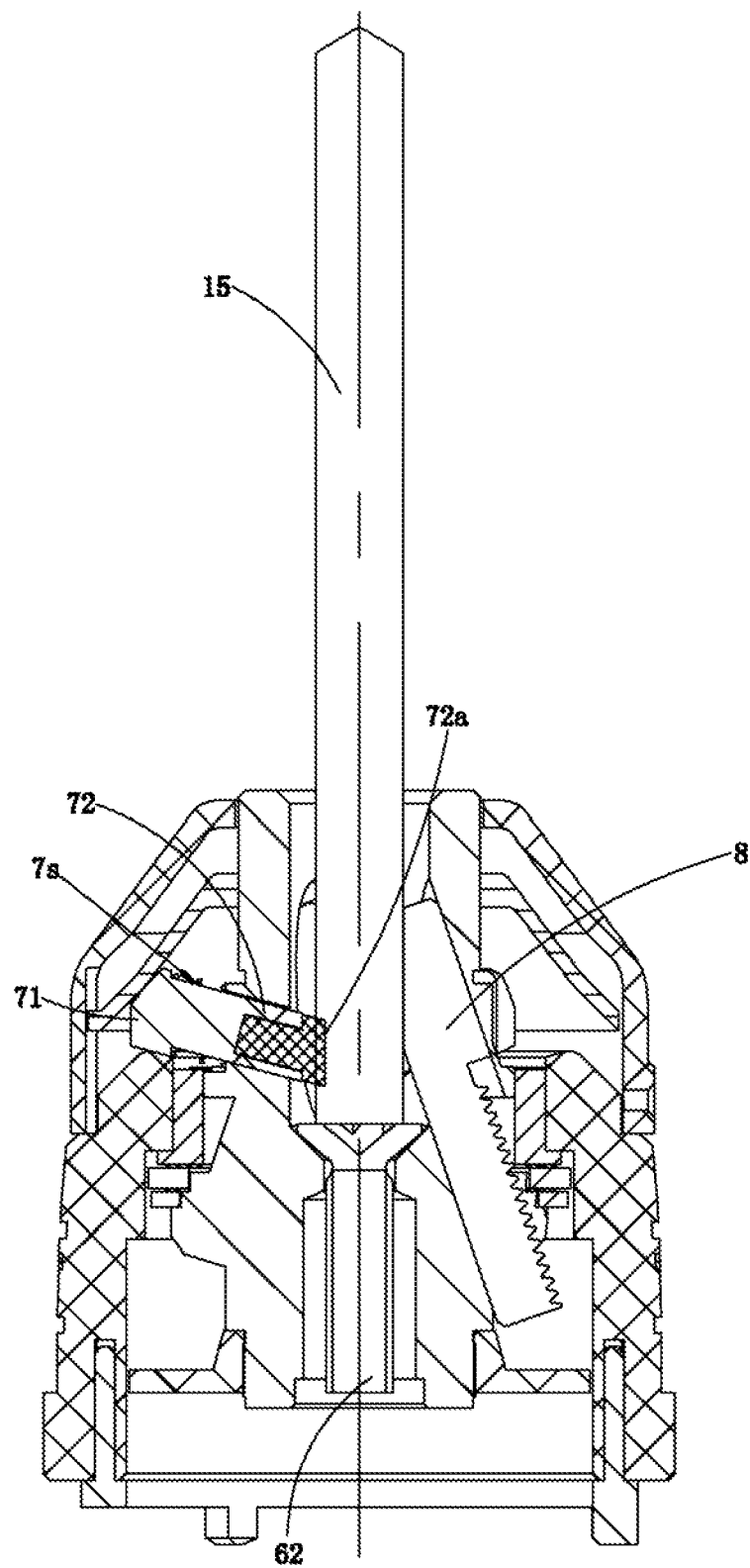
FIG. 5 is a sectional view that the chuck as shown in FIG. 1 being in a state that a locating member holds the tool bit, and chuck jaws do not clamp the tool bit yet.
Figure 6:
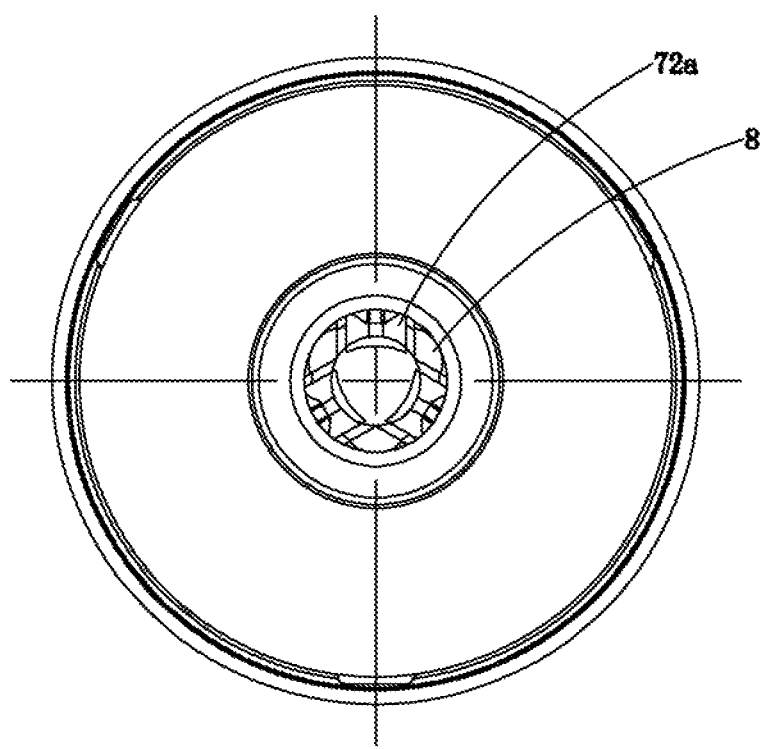
FIG. 6 is a top view that the chuck jaws and the locating member of the chuck as shown in FIG. 1 extending into a first shaft cavity.

Further, referring to FIGS. 5 and 6, if the sleeve 10 rotates along the first direction relative to the chuck body 6 or the chuck body 6 rotates along the second direction opposite to the first direction relative to the sleeve 10, the aperture of the clamping opening is reduced by the adjusting mechanism, by the pushing mechanism, the holding part 72 of the locating member 7 moves to the center of the first shaft cavity 6a from the second guide hole 6c, such that the tool bit 15 inserted into the first shaft cavity 6a can be pushed to the center of the clamping opening to be clamped by the chuck jaws 8. Similarly, if the sleeve 10 rotates along second direction opposite to the first direction relative to the chuck body 6 or the chuck body 6 rotates along the first direction relative to the sleeve 10, the aperture of the clamping opening is expanded due to the withdrawing of the chuck jaws 8, the holding part 72 of the locating member 7 is withdrawn from the first shaft cavity 6a from the center of the clamping opening due to the front moving of the driving ring 9 and under the reset action force of the spring 14.

In the core solution of the present invention, the relative movement of the sleeve 10 and the chuck body 6 can drive the adjusting mechanism and the pushing mechanism to move simultaneously. Due to the movement of the pushing mechanism, the locating member 7 pushes the tool bit 15 inserted into the first shaft cavity 6a to the center of the clamping opening, that is, the working inserted into the first shaft cavity 6a is straightened. The movement of the adjusting mechanism causes the clamping opening formed by the jaw 8 to be shrunk. The straightening action of the locating member 7 for the tool bit 15 occurs before the clamping opening of the chuck jaws 8 is reduced to lock the tool bit 15, such that the chuck jaws 8 can reliably clamp the tool bit 15 in the center of the clamping opening.

The embodiment of the present invention provides the holding device for the tool bit disposed in the chuck sleeve 10, which can automatically straighten the tool bit 15 in the process that the chuck jaws 8 lock the tool bit 15. The inclined clamping phenomenon which possibly occurs when the clamping purely depends on the chuck jaws 8 is avoided, the operation difficulty is reduced, and the user experience is improved.

Referring to FIG. 5, the locating member 7 in the embodiment of the present invention is disposed to be an elastic locating member 7s, and its holding part 72 is an elastic holding part preferably. Preferably, the end part of the holding part 72 extending to the first shaft cavity is provided with an elastic cushion 72a, which is a rubber elastic cushion preferably.

Referring to FIG. 6, in the present embodiment, the amount of the elastic locating members 7s is consistent with that of the chuck jaws 8, and the elastic locating members and the chuck jaws are disposed in a staggered manner respectively, and the three chuck jaws 8 and the three elastic holding parts 72 are separated for 120 degrees in the circumferential direction. Preferably, the tail ends of the elastic holding parts 72 extending into the first shaft cavity 6a from the second guide holes 6c are set into arc surfaces, the three arc surfaces define a circular holding opening, and the holding opening and the clamping opening defined by the chuck jaws 8 are concentric. It should be noted that before locking the clamping opening, the elastic locating members 7s hold the tool bit 15 to the clamping center of the clamping opening at first, and then continue to apply an elastic holding force to the tool bit 15 by the extrusion and deformation of the elastic rubber pads while the chuck jaws 8 lock the tool bit 15.

It should be noted that a second shaft cavity 62 suitable for mounting the drive shaft is further molded on the rear end of the chuck body 6, and the drive shaft may be the drive shaft of a drill gun. The drive shaft is connected to the chuck body 6 by the second shaft cavity 62 and the chuck body 6 is mechanically driven to rotate synchronously with the drive shaft. When the drive shaft is linked with the chuck body 6 or the sleeve 10 to rotate forward, the chuck jaws 8 lock the tool bit 15, and during backward rotating, the tool bit 15 is released.

In addition, there are many structures for implementing the pushing mechanism, in the present embodiment, the pushing mechanism is a pushing drive structure, and the pushing drive structure drives the locating member 7 to push the tool bit 15 inserted into the first shaft cavity 6a to the center of the clamping opening under driving that the sleeve 10 rotates along the first direction relative to the chuck body 6 or the chuck body 6 rotates along the second direction opposite to the first direction relative to the sleeve 10. An action force of the reset bias pressure part acts on the locating member 7, such that the locating member 7 has a trend of resetting to a direction away from the center of the clamping opening. The movement of the locating member 7 to the center of the clamping opening is driven by the pushing drive structure, the movement away from the center of the clamping opening is driven by the reset bias pressure part, and in this way, the pushing mechanism is simpler in structure and easier to implement.

The locating member 7 can be telescopically adjusted, such that the clamping force of the locating member 7 formed for the tool bit 15 is adjustable, and the locating member 7 can be adaptive to the straightening and locating of the tool bit 15 of different sizes, and is higher in applicability. Since the clamping opening formed by the locating member 7 is in an opening state when not clamping the tool bit 15, it is more favorable for the natural insertion of the tool bit 15, and the clamping structure is stable in structure and not prone to deform.

The pushing drive structure comprises a driving ring 9 disposed around the chuck body 6, and a first transmission mechanism converting the rotary motion of the chuck body 6 into reciprocating motion of driving the driving ring 9 to move in a reciprocating manner along the axial direction of the chuck body 6, preferably, the first transmission mechanism comprises a threaded structure disposed between the inner surface of the driving ring 9 and the outer surface of the chuck body 6, and a restricting mechanism disposed between the driving ring 9 and the inner wall of the sleeve 10 and stopping the driving ring 9 from rotating.

An action process of the chuck provided by the present embodiment is as follows: as shown in FIG. 2, when the tool bit 15 is inserted into the first shaft cavity, the chuck body 6 and the sleeve 10 are subjected to relative rotation by linkage of a mechanical shaft, the driving ring 9 is driven to be in threaded cooperation with the chuck body 6, and to be limited by the restricting mechanism between the driving ring and the inner wall of the front sleeve 10a to downward move in the axial direction of the chuck body 6, such that an inclined abutting force is formed for the locating member 7 in the second guide hole 6c, and the locating member 7 is caused to push the tool bit 15 to move to the center of the clamping opening. Meanwhile, the relative rotation between the chuck body 6 and the sleeve 10 also drives the clamp claws 8 to be cooperated with the screw nut 5 so as to upward move along the first guide holes 6b, and the clamping opening is driven to be shrunk. After the tool bit 15 is held to the center of the clamping opening by the locating member 7, the chuck jaws 8 continue to apply a clamping force to the tool bit 15 to lock and fix the tool bit 15, and the locating member 7 further applies an elastic holding force to the tool bit 15 by the extrusion and deformation of the elastic cushions 72a.

In addition, a support ring 2 supporting the chuck body 6 is disposed on the inner wall of the back sleeve 10b. An end bearing 4 is disposed between the back sleeve 10b and the chuck body 6, one side of the end bearing 4 is disposed by clinging to the screw nut 5, and the other side is provided with a washer 3 for limiting.

Second Embodiment

Figure 7:
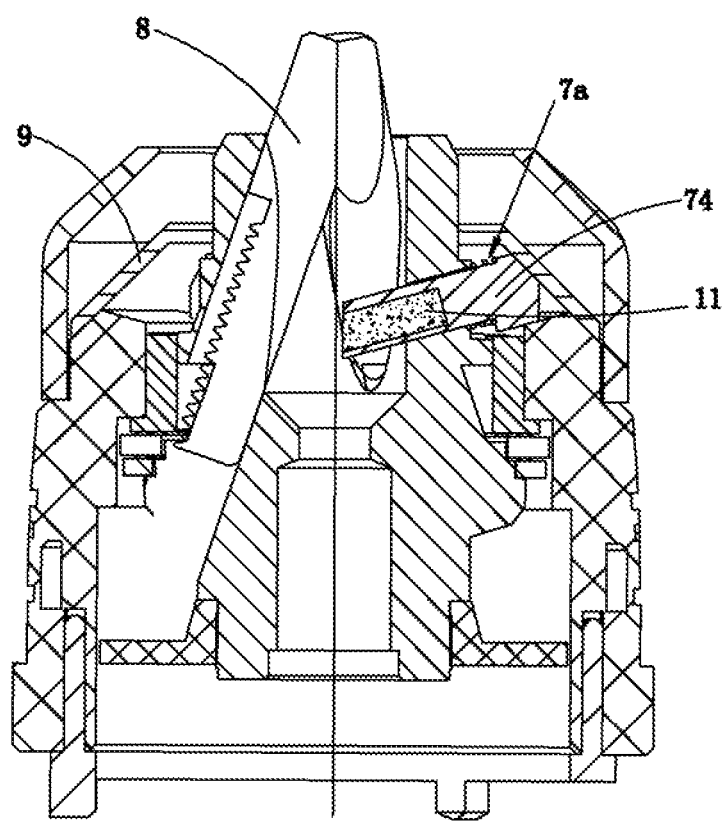
FIG. 7 is a sectional view of a chuck according to a second embodiment of the present invention.
Figure 8:
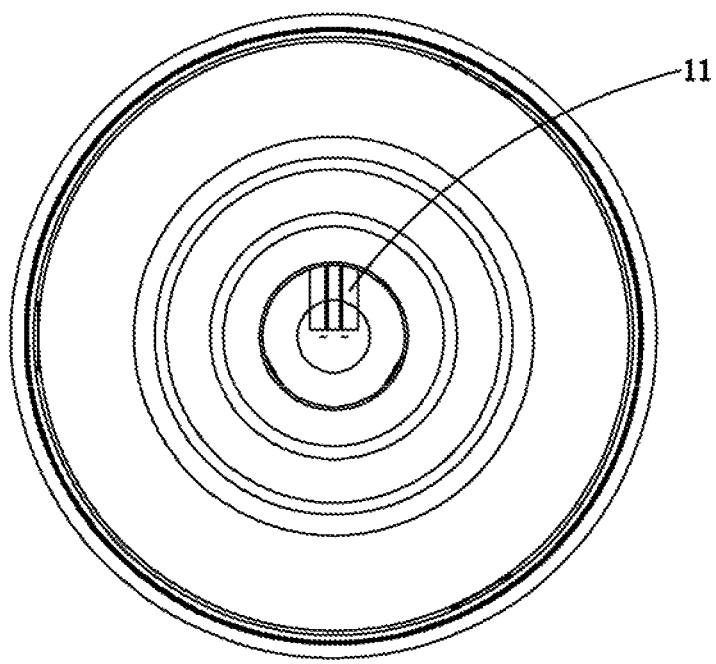
FIG. 8 is a top view that a locating member as shown in FIG. 7 extending into the first shaft cavity.

FIG. 7 is a sectional view of a chuck provided in a second embodiment of the present invention. FIG. 8 is a top view of a locating member as shown in FIG. 7. The present embodiment is an alternate embodiment of the first embodiment, and provides a chuck, and such chuck differs from the first embodiment in:

As shown in FIG. 7, the locating member in the present embodiment is a magnetic locating member 7a, and compared with the of the elastic locating member 7s of the first embodiment, there is only one magnetic locating member 7a, which is disposed opposite to one of the clawing claws 8, in this way, the chuck jaws 8 and the magnetic locating member 7a can abut against the tool bit toward two directions, the aligning effect is more precise, the magnetic locating member 7a comprises a holding part 74 and a magnet 11 disposed on the end part of the holding part 74 extending to the first shaft cavity for adsorbing the tool bit 15, since the tool bit 15 is mostly made of a metal material, by disposing the magnet 11 on the holding part 74, the tool bit 15 is automatically adsorbed to a holding surface of the locating member 7a by a magnetic force action when inserted into the first shaft cavity, then the tool bit 15 is pushed to the center of the clamping opening of the chuck jaws 8 by the locating member 7a, not only is the automatic aligning precision of the tool bit 15 improved, but also the tool bit 15 is initially fixed by the magnetic force absorbing action, and the tool bit 15 is prevented from falling off. Of course, when the tool bit 15 is not made of the metal material, the effects can be realized by disposing the magnet on the tool bit.

Of course, the amount of the magnetic locating member 7a is not limited to one and may be three, the magnetic locating members 7a are respectively disposed opposite to the chuck jaws 8, the inclined clamping caused by a fact that the tool bit 15 is inserted into gaps between the adjacent clawing claws 8 can be effectively prevented, and in the present embodiment, a thread pitch between the driving ring 9 and the chuck body 6 is same as that between the jaws 8 and the screw nut 5, such that when the chuck body 6 rotates, the locating member 7 and the jaw 8 are driven to rotate synchronously.

An action process of the chuck provided by the present embodiment is as follows: after the tool bit 15 is inserted into the first shaft cavity 6a to be adsorbed to a magnetic end of the magnetic locating member 7a by the magnetic force, the chuck body 6 is driven by the drive shaft to rotate relative to the sleeve 10, while the jaw 8 is driven to be shrunk to the center of the clamping opening, the driving ring 9 is driven to downward move to form an abutting force toward the first shaft cavity 6a for the magnetic locating member 7a, such that the magnetic locating member 7a pushes the tool bit 15 to move to the center of the clamping opening, while the tool bit 15 arrives at the center of the clamping opening, the clamping opening is fastened to lock and fix the tool bit 15 by the chuck jaws 8.

Third Embodiment

Figure 9:
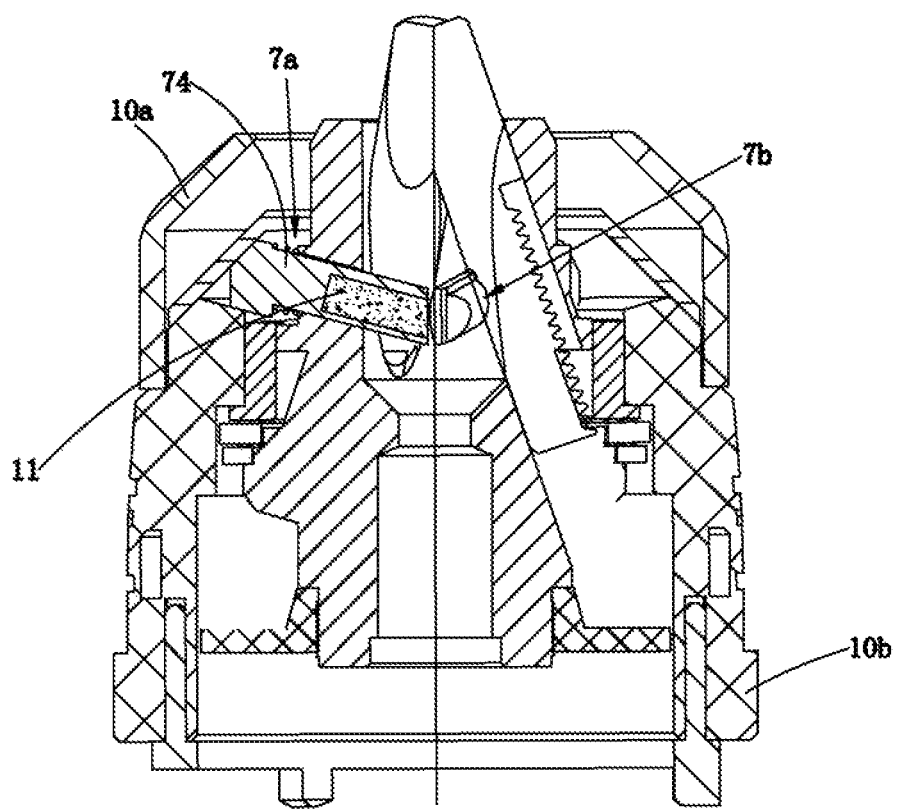
FIG. 9 is a sectional view of a chuck according to a third embodiment of the present invention.
Figure 10:
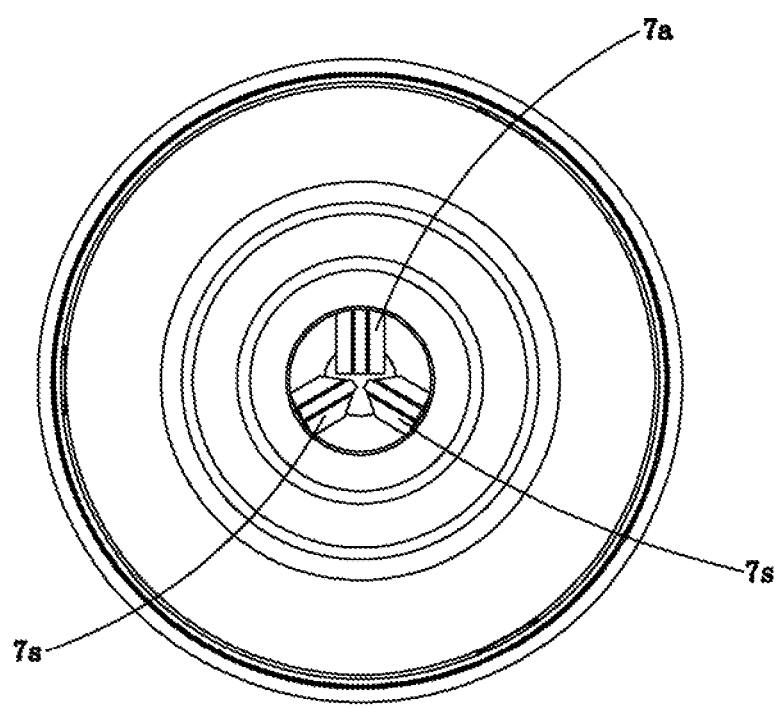
FIG. 10 is a top view that a locating member as shown in FIG. 9 extending into the first shaft cavity.
Figure 11:
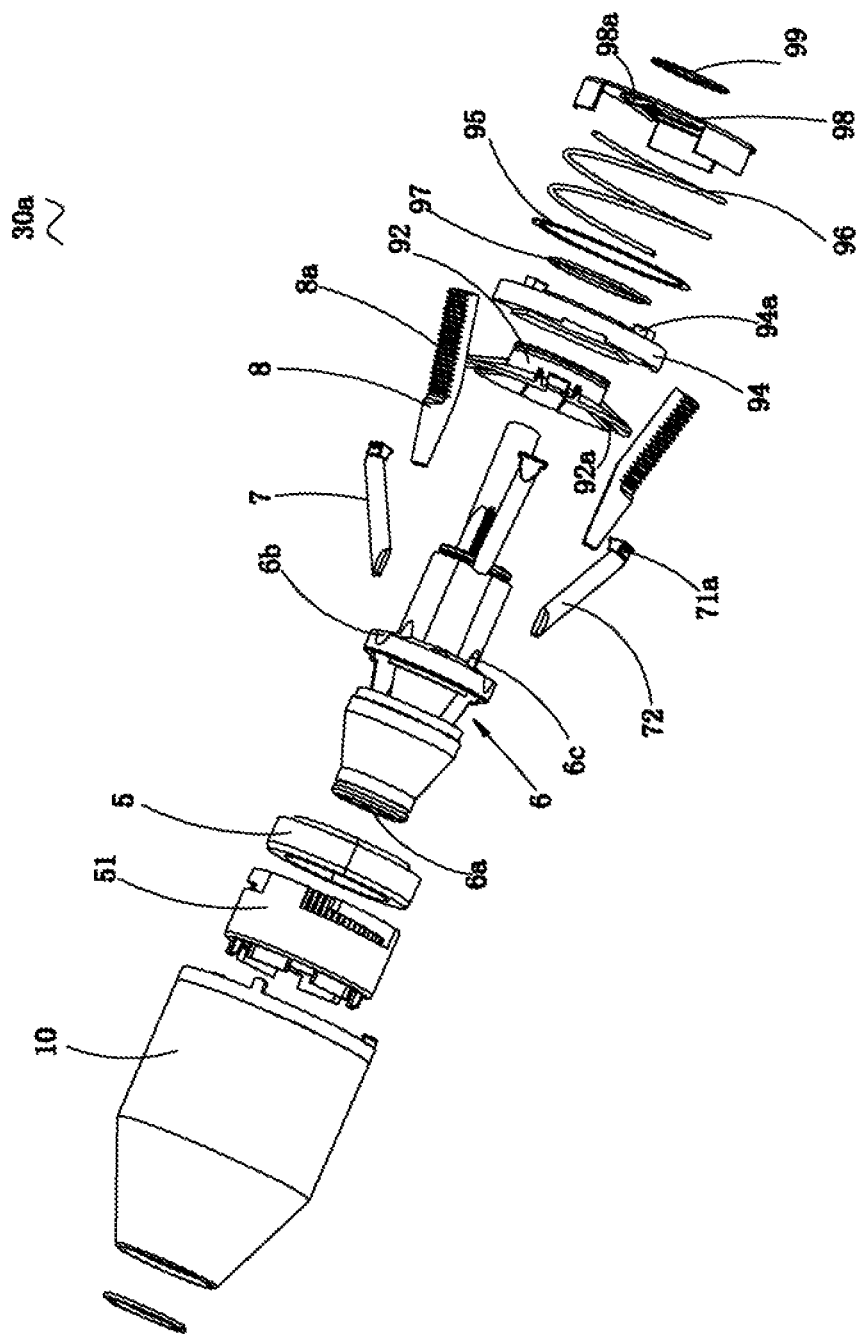
FIG. 11 is a stereoscopic exploded view of a chuck according to a fourth embodiment of the present invention.

FIG. 9 is a sectional view of a chuck provided in a third embodiment of the present invention. FIG. 10 is a top view of a locating member as shown in FIG. 9. The present embodiment is an alternate embodiment of the first embodiment, and provides a chuck, and such chuck differs from the first embodiment in:

In the present embodiment, the locating members and the chuck jaws 8 are disposed oppositely, the amount of the locating members is consistent with that of the chuck jaws 8, the locating member comprises a magnetic locating member 7a and a nonmagnetic locating member 7b, wherein the magnetic locating member 7a comprises a holding part 74 and a magnet 11 disposed on the end part of the holding part 74 extending into the first shaft cavity for adsorbing the tool bit 15, and the nonmagnetic locating member 7b comprises a holding part.

As shown in FIG. 10, in the present embodiment, the amount of the chuck jaws 8 and the amount of the locating members are three preferably, wherein a configuring manner of the locating members may be one magnetic locating member 7a and two elastic locating members 7s, wherein the elastic locating member 7s comprises a holding part 72 and an elastic cushion 72a disposed on the end part of the holding part 72 extending into the first shaft cavity. By cooperatively disposing the magnetic locating members 7a and the elastic locating members 7s, not only is magnetic force adsorption provided for the tool bit 15, but also an elastic pre-tightening force is provided, such that the tool bit 15 can be reliably adsorbed to the locating members 7 by means of the magnetic force while being automatically aligned, and is prevented from falling off. Of course, the elastic locating members 7s in the present embodiment may be replaced with the nonmagnetic locating members 7b.

Fourth Embodiment

FIG. 11 to FIG. 14 show a chuck 3a according to a fourth embodiment of the present invention. In the present embodiment, the chuck 30a has a working principle similar to the chuck 30 of the first embodiment, and the same structures are represented with the same numbers in the present embodiment without repeating.

The sleeve 10 in the present embodiment is disposed integrally, the chuck body 6 is contained in the sleeve 10, the chuck body 6 is movably provided with the chuck jaws 8 and the locating members 7, and the amount of the locating members 7 and the amount of the chuck jaws 8 are consistent and are both three. The screw nut 5 is disposed between the sleeve 10 and the chuck body 6, and the internal threads of the screw nut 5 are meshed with the external threads 8a of the chuck jaws. The screw nut 5 is disposed in a support member 51 and connected to the sleeve 10 without relative rotation by the support member 51. The locating member 7 comprises a holding part 72 and a first matching-connecting 71a. Specifically, the first matching-connecting 71a comprises a main body part and lugs extending from the main body part to the two sides.

The pushing mechanism of the present invention is disposed on the inner side of the sleeve 10 and close to the rear end of the chuck body 6, the pushing mechanism comprises a driving member 92 matched and connected with the locating member 7, and a second transmission mechanism connected to the driving member. Wherein the second transmission mechanism comprises a transmission member 94, an elastic member 96 and a support member 98 which are disposed in sequence, wherein the driving member 92 is provided with a flange part, the transmission member 96 sleeves the flange part of the driving member 92, and the transmission member 96 is matched and connected together with the driving member 92 by a snap spring 97 without relative rotation. Wherein the driving member 94 is provided with a second matching part, configured to be matched and connected with the first matching part 71a of the locating member 7, the second matching part 94a of the present embodiment is disposed to be a clamping groove, and the clamping groove is clamped and connected with the main body part between the two extending lugs of the first matching part 71a. The support member 98 is fixedly disposed relative to the sleeve 10. The elastic member 96 is disposed between the transmission member 94 and the support member 98. One end of the elastic member 96 is abutted against the support member 98, and the other end is abutted against the transmission member 94 by a washer 95. The end surface of the transmission member 94 toward the support member 98 is provided with a first abutting part 94a, and the end surface of the support member 98 toward the transmission member 94 is provided with a second abutting part 98a.

Figure 12:
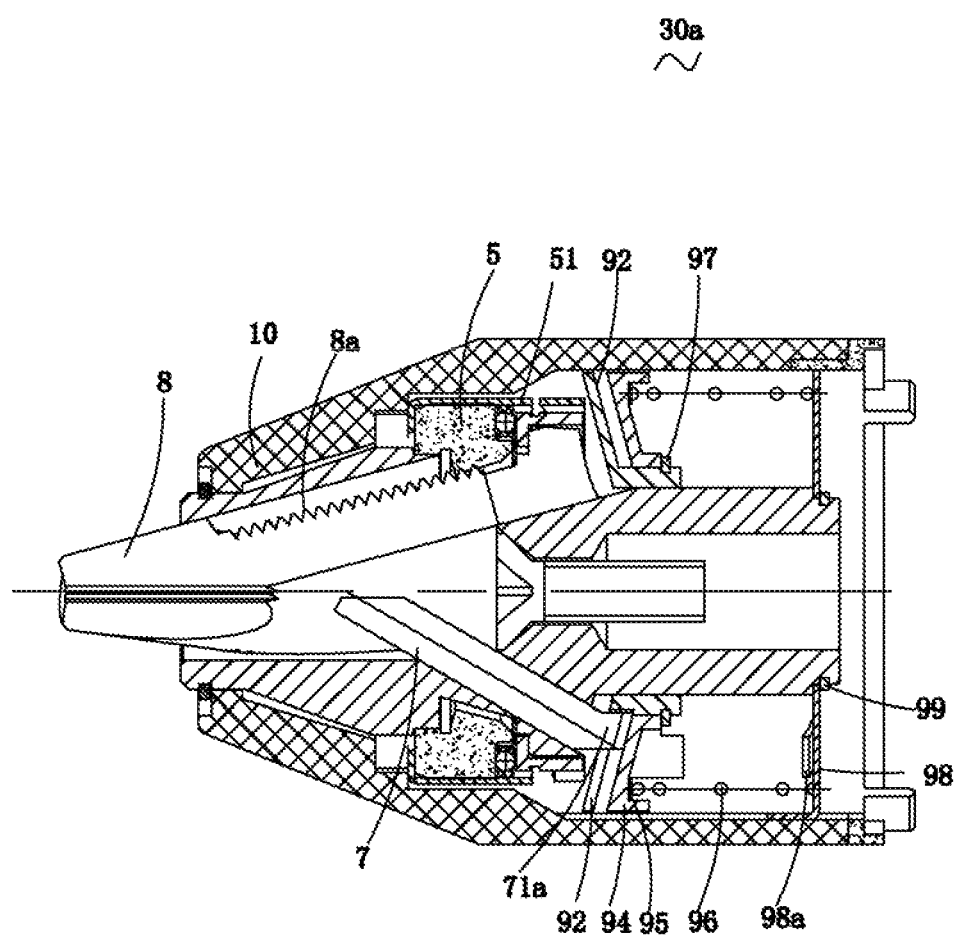
FIG. 12 is a sectional view that a clamping opening of the chuck as shown in FIG. 11 being in a closing state.

Referring to FIG. 12, the chuck 30a is in a nonworking state, the tool bit has been withdrawn from the clamping opening, and clamping ends of the chuck jaws 8 extending into the first shaft cavity 6 approaching to each other. The locating members 7 extend into the first shaft cavity 6a and move to the center of the clamping opening to approach to each other. At this point, the elastic member 96 is in a stretching state.

Figure 13:
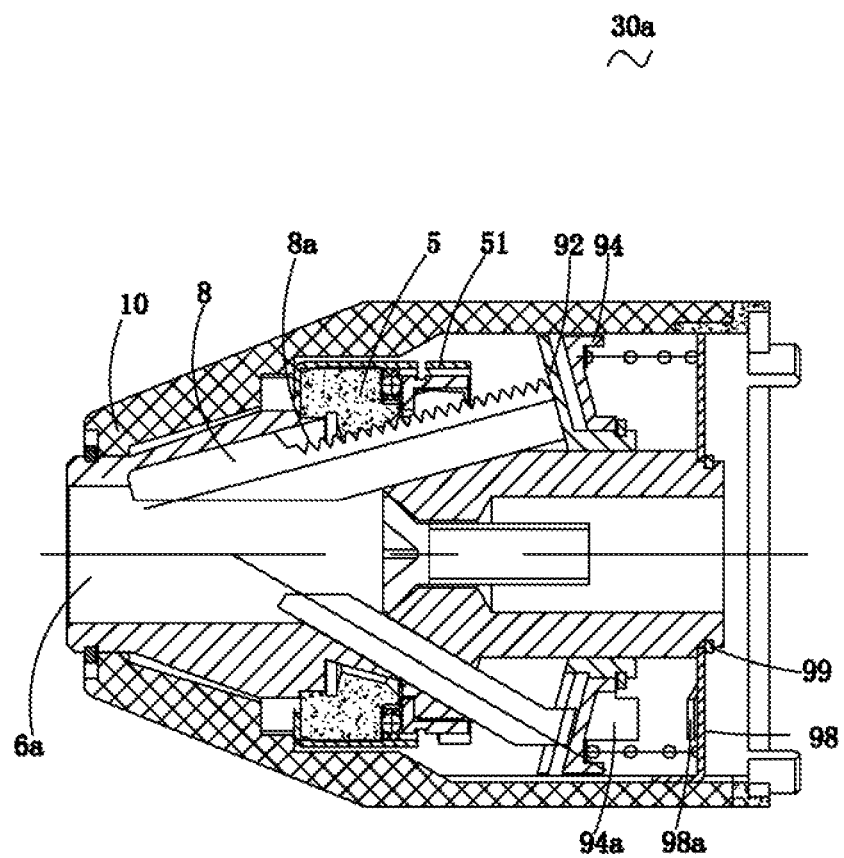
FIG. 13 is a sectional view that the clamping opening of the chuck as shown in FIG. 11 being in an opening state, and at this point, the locating member being not withdrawn from the first shaft cavity.
Figure 14:
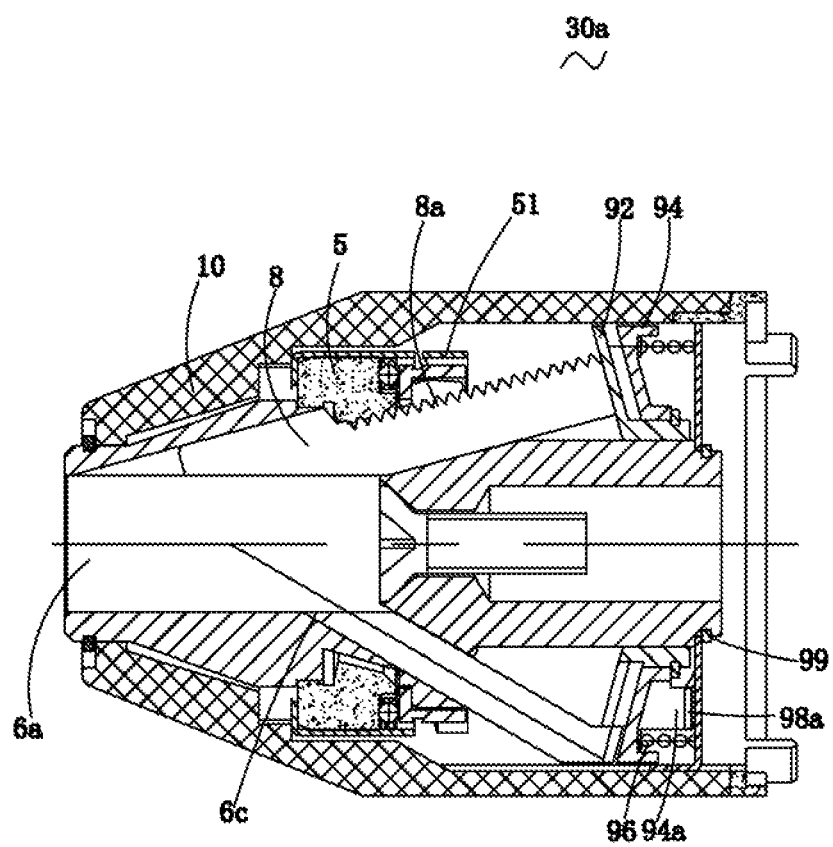
FIG. 14 is a sectional view that the clamping opening of the chuck as shown in FIG. 11 being in an opening state, the locating member has been withdrawn from the first shaft cavity.

Further referring to FIGS. 13 and 14, when the tool bit is inserted into the clamping opening of the chuck 30a and locks the tool bit, the sleeve 10 is rotated relative to the chuck body 6 along a first direction, and the sleeve 10 drives the screw nut 5 to rotate therewith, such that the chuck jaws 8 slide to the rear end of the sleeve 10 relative to the chuck body 6, and the clamping opening is gradually opened. With further sliding of the chuck jaws 8, the back ends of the chuck jaws 8 begin to abut against the driving member 92, and with the sliding of the chuck jaws 8, the driving member 92 and the support member 94 are pushed to overcome an action force of the elastic member 96 together so as to move to the rear end of the chuck body 6, such that the elastic member 96 is compressed, and the holding part 72 of the locating member 7 is applied with an action of the driving member 92 to gradually move out of the first shaft cavity 6a. At this point, the tool bit (not shown) may be inserted into the clamping opening formed by the chuck jaws 8 from the first shaft cavity 6a, and the holding opening formed by the locating members 7.

Referring to FIG. 14, it should be pointed out that when the chuck jaws 8 move to a limiting position of the rear end of the chuck body 6, the first abutting part 94a of the transmission member 94 and the second abutting part 98a of the second abutting part 98 interfere with each other, thereby preventing the sleeve 10 from being excessively rotating relative to the chuck body 6, and the condition that the sleeve 10 and the chuck body 6 are deadlocked is avoided.

On the contrary, if the sleeve 10 is rotated along a second direction opposite to the first direction, in the rotary process, the chuck jaws 8 gradually move to the chuck body 6, under the action of an elastic restoring force of the elastic member 96, the transmitting part 94 moves from the rear end to the front end of the chuck body 6, such that the driving member 92 drives the holding part 72 of the locating member 7 to move to the center of the first shaft cavity 6a from the second guide holes 6c, and therefore, the tool bit inserted into the first shaft cavity 6a can be pushed to the center of the clamping opening to be clamped by the chuck jaws 8. Due to the movement of the pushing mechanism, the tool bit inserted into the first shaft cavity 6a is pushed by the locating member 7 to the center the clamping opening to be straightened. Due to the movement of the adjusting mechanism, the clamping opening formed by the chuck jaws 8 is shrunk, such that the chuck jaws 8 can reliably clamp the tool bit 15 in the center of the clamping opening.

In actual operation, by mechanical linkage, the relative rotation between the chuck body 6 and the sleeve 10 is realized, such that the holding part 72 of the locating member 7 is caused to push the tool bit to move to the center of the clamping opening. In the meantime, the chuck jaws 8 are driven by the relative rotation of the chuck body 6 and the sleeve 10 to lock the clamping opening, the clamping opening is locked while the holding part 74 holds the tool bit to the center of the clamping opening, and the working is fixed. When the drive shaft is linked with the chuck body 6 or the sleeve 10 for backward rotation, the tool bit 15 is released.

We claim:

1. A chuck, comprising:
   a sleeve;
   a chuck body rotatably disposed in the sleeve, wherein a longitudinal axis is defined extending along the direction of the chuck body, and wherein the chuck body has a first shaft cavity for receiving a tool bit;
   a plurality of chuck jaws configured to be distributed in the chuck body about the longitudinal axis, wherein the plurality of chuck jaws are configured to be movable relative to the chuck body to clamp or release the tool bit;
   an adjusting mechanism disposed between the sleeve and the chuck jaws being configured to adjust relative displacement between the chuck jaws and the chuck body;
   wherein the chuck further comprising at least one locating member being disposed between adjacent chuck jaws in the chuck body and a pushing mechanism, when the adjusting mechanism drives the chuck jaws moving close to the longitudinal axis, the locating member is driven by the pushing mechanism to move toward the longitudinal axis, and wherein the tool bit is held by the locating member before the tool bit is clamped by the chuck jaws; and
   when the adjusting mechanism drives the chuck jaws moving away from each other along the longitudinal axis, the locating member is driven by the pushing mechanism to move away from the longitudinal axis.

2. The chuck according to claim 1, wherein the chuck body is provided with a plurality of first guide holes and at least one second guide hole formed on a side wall of the chuck body and communicating with the first shaft cavity, and wherein the plurality of first guide holes are annularly distributed around the first shaft cavity, the chuck jaws respectively extends into the first shaft cavity through the first guiding hole and the locating member extending into the first shaft cavity through the second guide hole.

3. The chuck according to claim 2, wherein a center line of the first shaft cavity is coaxial with the longitudinal axis of the chuck body, and projections of the first guide holes and the second guide hole on the longitudinal axis are spaced apart.

4. The chuck according to claim 3, wherein when the sleeve rotates along a first direction relative to the chuck body, the locating member extends into the first shaft cavity close to the longitudinal axis through the second guide hole to hold the tool bit, and the chuck jaws extend into the first shaft cavity through the first guide holes and approach to each other relative to the longitudinal axis so as to clamp the tool bit received in the first shaft cavity of the chuck body, when the sleeve rotates in a second direction opposite to the first direction relative to the chuck body, the locating member moves away from the longitudinal axis, and the chuck jaws are apart from the longitudinal axis to release the tool bit received in the first shaft cavity of the chuck body.

5. The chuck according to claim 2, wherein the pushing mechanism comprises a first driving member sleeved on the chuck body and a first transmission mechanism for converting a rotation motion of the first driving member relative to the chuck body into a reciprocating motion of the first driving member along an axial direction of the chuck body.

6. The chuck according to claim 5, wherein the first transmission mechanism comprises a thread component disposed between an inner surface of the first driving member and an outer surface of the chuck body.

7. The chuck according to claim 5, further comprising a restricting mechanism disposed between the first driving member and the sleeve, the restricting mechanism is configured to prevent the first driving member from rotating relative to the sleeve.

8. The chuck according to claim 7, wherein the restricting mechanism comprises a first guide part disposed on the first driving member and extending along an axial direction of the first driving member, and a second guide part disposed on the inner wall of the sleeve and cooperating with the first guide part, one of the first guide part and the second guide part is configured as a guide rail and the other of the first guide part and the second guide part is configured as a guide groove to be engaged with the guide rail.

9. The chuck according to claim 5, wherein the pushing mechanism further comprises a first biasing member biased against the locating member, thus the locating member has a moving tendency to move away from the longitudinal axis.

10. The chuck according to claim 9, wherein the first driving member comprises a first inclined pushing surface, the locating member comprises a matching part abutting against the inclined pushing surface and a holding part for extending into the first shaft cavity.

11. The chuck according to claim 10, wherein the first biasing member is a spring sleeved around the holding part, one end of the spring abutting against the chuck body and the other end of the spring abuts against a step surface of the matching part.

12. The chuck according to claim 2, wherein the pushing mechanism comprises a second driving member cooperated with the locating member, and a second transmission mechanism for matching with the second driving member, the chuck jaws selectively abut against the second driving member to push the second driving member moving or to be separated from the second driving member, and when the chuck jaws abut against the second driving member and push the second driving member to move, the locating member is away from the longitudinal axis.

13. The chuck according to claim 12, wherein the pushing mechanism further comprises a second biasing member for providing a restoring force towards the longitudinal axis when the chuck jaws are separated from the second driving member.

14. The chuck according to claim 13, wherein the second transmission mechanism comprises a transmission member coupled to the second driving member and a support member fixedly disposed relative to the chuck body, the second biasing member is disposed between the transmission member and the support member.

15. The chuck according to claim 1, wherein the locating member is configured as a plurality of elastic locating members.

16. The chuck according to claim 15, wherein the elastic locating member comprises a holding part and an elastic cushion disposed at the end of the holding part away from the pushing mechanism, the elastic cushion is configured to provide elastic holding force to the tool bit.

17. The chuck according to claim 1, wherein an amount of the locating members is consistent with an amount of the chuck jaws.

18. The chuck according to claim 17, wherein the locating members are respectively disposed between two adjacent chuck jaws.

19. The chuck according to claim 1, wherein the sleeve comprises a front sleeve and a rear sleeve coupled to the front sleeve, a screw nut is disposed between the rear sleeve and the chuck body.

* * * * *